Patented July 18, 1944

2,353,808

UNITED STATES PATENT OFFICE 2,353,808

COMPOUNDS OF THE CYCLOPENTANO-POLYHYDROPHENANTHRENE SERIES AND A PROCESS FOR THE MANUFACTURE OF THE SAME

Adolf Butenandt, Berlin-Dahlem, and Josef Schmidt-Thomé, Berlin-Zehlendorf, Germany, and Erwin Schwenk, Bloomfield, N. J., assignors to Schering Corporation, Bloomfield, N. J., a corporation of New Jersey No Drawing. Application June 30, 1939, Serial No. 282,126. In Germany July 1, 1938

19 Claims. (Cl. 260—397.4)

This invention relates to compounds of the cyclopentano - polyhydrophenanthrene - series and a process for the manufacture of the same.

In U. S. specification Ser. No. 214,957 there is described a process for the manufacture of compounds of the cyclopentanopolyhydrophenanthrene series, wherein compounds of this series which exhibit on the carbon-17 a side chain, in which in adjacent position to a keto group a reactive methyl or methylene group is located, are condensed with oxo compounds and the condensation products subjected to an oxidation process.

In accordance with the present invention keto compounds of the androstane and estrane series are condensed with oxo compounds such as ketones in the presence of alkaline reacting substances, such as the alkali and alkaline earth metals, for example sodium, potassium, magnesium, metal alcoholates, such as sodium alcoholate and so on, as are described for example in Houben-Weyl, Die Methoden der organ. Chemie, 1922, vol. 2, page 693 et seq. The condensation also takes place here with the methylene group in adjacent position to the keto group, whereby compounds are obtained which instead of the methylene group contain a C=C— bond.

Particularly valuable compounds are obtained when cyclopentano-polyhydrophenanthrene compounds are employed as starting materials in the case of which a keto group is present in 17-position. The condensation then takes place on the C-atom 16.

As ketones there can be employed both symmetrical ketones, as for example acetone, and also mixed ketones, as for example methyl-ethyl ketone, methyl-propyl ketone and the like, and also aromatic ketones, as for example benzophenone or acetophenone and the like. However, also other oxo compounds as for example aldehydes can be employed.

The condensation products obtained are then subjected to an oxidation process, for example with ozone, whereby the double bond produced in the condensation is ruptured with formation of a keto group, so that $\alpha,\beta$-diketones are obtained. Instead of ozone also other energetic oxidising agents can be employed, which are capable of splitting up a carbon-carbon double bond, as for example chromic acid, lead and manganese tetraacetate, alkali permanganates, and per-iodic acid; if desired the oxidation can also be carried out in such a manner that at the double bond there are first added on in the manner known per se two hydroxyl groups, for example by means of osmium tetroxide and then the further oxidation is carried out with one of the above mentioned agents. In this manner the same $\alpha,\beta$-diketones are obtained.

These can if desired be converted by reduction, for example with zinc-glacial acetic acid, into keto alcohols and further by hydrogenation, for example with Raney nickel, into the corresponding $\alpha,\beta$-glycols.

For the oxidation it is in some cases suitable to protect hydroxyl or other sensitive groupings present in the ring system by esterification, etherification or other conversion into such groups as can be again reconverted into hydroxyl and the like groups. Similarly, where the starting compound has one or more double bonds, these may be protected against the action of the oxidizing agent in known manner by intermediate saturation with a substituent of the type which can subsequently be split off to restore the double bond or bonds.

The following examples illustrate the invention:

EXAMPLE 1

Condensation of dehydroandrosterone acetate with methyl-ethyl ketone 10 grams of dehydroandrosterone acetate are dissolved in 45 ccs. of methyl-ethyl ketone and 30 ccs. of ether and the mixture allowed to flow into 9 grams of sodium in 30 ccs. of ether. The whole is heated to boiling for half an hour. Thereupon 25 ccs. of glacial acetic acid are allowed to flow in and subsequently so much water that all passes into solution. The ether layer is separated and washed with water, sodium hydroxide solution and water. To the residue remaining after the evaporation of the ether, there are added 15 grams of Girard-Reagent T (trimethylaminoacetohydrazide hydrochloride—Helv. Chim. Acta, 19, 1095 (1936)) and 60 ccs. of alcohol, 2 ccs. of water and 2 ccs. of glacial acetic acid. The mixture is boiled for half an hour. By this means products which have been produced by condensation of the methyl-ethyl ketone with itself are removed while the condensation product of the dehydroandrosterone does not react with Girard-Reagent. The reaction solution is poured into 1½ litres of water, extracted with ether and washed with water, sodium hydroxide solution and water. The residue remaining after drying gives on crystallisation from acetone 3.8 grams of condensation product of M. P. 161–68° C. The mother liquors are distilled in high vacuum at 130° C. The liquid products which pass over first are separated. On further high vacuum distillation there passes over at 180° C. 1 gram of condensation product. Total yield 4.8 grams. M. P. of the pure product 174–76° C.

The condensation with dehydroandrosterone under the same conditions yields the same product. By the application of magnesium as condensing agent, and with the dehydroandrosterone in benzene solution, the same result is obtained.

EXAMPLE 2

*Condensation of dehydroandrosterone acetate with acetone*

By corresponding condensation of dehydroandrosterone acetate with acetone a condensation product of M. P. 222–23° C. is obtained which crystallises from alcohol-water in needles.

EXAMPLE 3

*Acetate of the condensation product of dehydroandrosterone acetate with methyl ethyl ketone*

4 grams of condensation product are boiled in 10 ccs. of acetic anhydride for 10 minutes. To the hot solution water is added to the point of turbidity. On cooling the acetate crystallises out. After filtering off and washing with water there are obtained from acetone 3.9 grams of acetate II in needles of M. P. 148° C.

EXAMPLE 4

*Conversion of the condensation products into 16.17-diols. Ozonisation of the 3-acetate of the condensation product of dehydroandrosterone with methyl ethyl ketone*

3 grams of the acetate of the condensation product (II) are ozonised in portions of 200 mg. each according to the following method: 200 mg. of acetate are dissolved in 5 ccs. of chloroform, 2 ccs. of bromine solution (corresponding to 1 mol bromine) introduced and for 3 minutes ozone passed through the solution (corresponding to about 100 ccs. of 6% ozone). The chloroform is blown off in the cold by an air stream and the residue boiled in 5 ccs. of glacial acetic acid with the addition of 500 mg. of zinc dust for 10 minutes. The zinc is filtered off and the solution poured into water. The portions now combined are together extracted with ether and the ethereal solution washed with sodium hydroxide solution and water. The residue remaining after the evaporation of the ether is treated with 30 ccs. of alcohol, 3 grams of Girard-Reagent T and 3 ccs. of glacial acetic acid and the mixture boiled for half an hour. Thereupon the whole is poured into 300 ccs. of ice cold water, which contains so much sodium carbonate that bromo-thymol is not quite changed to blue, and extracted with ether. The water layer is separated and acidified with so much sulphuric acid that the solution is 1 N as regards acid. After 2 hours the precipitated product is filtered off (or extracted with ether), washed with sodium hydroxide solution and water and dried. After the crystallisation from methanol there are obtained 330 mg. of a substance of M. P. 187–90° C. The analytically pure product melts at 190–92° C. It crystallises with 1 mol of water of crystallisation. The product is the 3-acetoxy-$\Delta^5$-androstenol-(16)-one-(17) (IV) or the 3-acetoxy-$\Delta^5$-androstenol-(17)-one-(16) (V). In the debromination with zinc dust simultaneously one of the keto groups of the 16.17-diketone (III) primarily formed after the ozonisation is reduced to the alcohol group. (In the aqueous alkali solution which is employed for extracting the ether solution of the ozonisation product, there is present an ocetoxy-dicarboxylic acid produced by splitting of the 5-ring.)

By reaction of the acetoxy-androstenolone (IV or V) with hydroxylamine acetate in alcohol the monoxime is obtained which crystallises from alcohol in leaflets of M. P. 244° C. (with decomposition).

By the action of acetic anhydride-pyridine in the cold the diacetate of the 3-hydroxy-$\Delta^5$-androstenolone is obtained which forms needles of M. P. 123° C.

EXAMPLE 5

*Reduction of the 3-acetoxy-$\Delta^5$-androstenolone*

100 mg. of the acetate (IV or V) are hydrogenated up to saturation in ethyl acetate with Raney nickel. After filtering off the nickel and evaporation of the ethyl acetate there is obtained from acetone the 3-acetoxy-$\Delta^5$-androstendiol-(16.17) (VI) in leaflets of M. P. 179° C. It is allowed to stand over night at room temperature with pyridine-acetic anhydride and in this manner converted into the $\Delta^5$-androstentriol-(3.16.17)-triacetate (VII), which crystallises in prismatic needles of M. P. 222–24° C.

The reaction may be illustrated by the following formulae which show the conversion of androstenolone into androstenol-dione and androsten-triol:

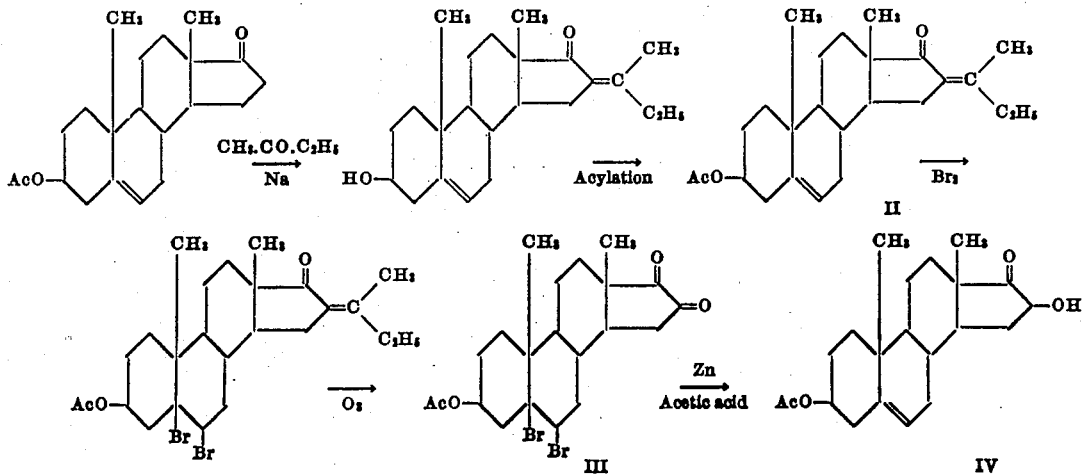

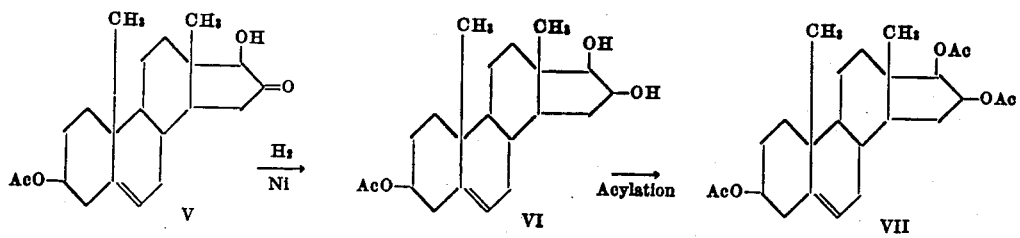

Of course, many changes and variations may be made in the reaction conditions by those skilled in the art in accordance with the principles set forth herein and in the claims annexed hereto.

What we claim is:

1. Process for the manufacture of compounds of the cyclopentano-polyhydrophenanthrene series, wherein a member of the group consisting of saturated and unsaturated ketones of the androstane and estrane series is condensed with an oxo compound in the presence of an agent capable of condensing a carbonyl group with a nuclear methylene group.

2. Process as claimed in claim 1 in which the condensation takes place in the presence of an alkaline reacting substance.

3. Process as claimed in claim 1 in which as condensing agent an alkali metal is employed.

4. Process as claimed in claim 1 in which the condensation product is subjected to an oxidation process to rupture the double bond produced in the condensation and to form $\alpha,\beta$-diketones.

5. Process as claimed in claim 1, in which as starting materials a ketone of the androstane series is employed.

6. Process as claimed in claim 1, in which as starting material there is employed a member of the group consisting of dehydroandrosterone and its derivatives wherein the 3-hydroxyl group is replaced by a group convertible with the aid of hydrolysis into hydroxyl.

7. Process as claimed in claim 1, in which double bonds present in the ring system are protected by adding on such substances as can again be split off with reformation of the double bond.

8. Process as claimed in claim 1, in which in the application of starting materials containing hydroxyl groups these latter are protected by conversion into groups which can again be reconverted into the hydroxyl group by hydrolysis.

9. Process for the manufacture of $\alpha,\beta$-diketones of the androstane and estrane series wherein the condensation products of the ketones of the said series with oxo-compounds are subjected to an oxidation process with ozone.

10. Process for the manufacture of compounds of the androstane and estrane series having an alcohol group in at least one of the 16 and 17 positions, comprising subjecting a 16,17-diketone obtained by oxidation of the condensation product of a ketone of the androstane and estrane series with an oxo compound, to the action of an agent capable of reducing a keto group to an alcohol group.

11. Process as claimed in claim 10 wherein as reducing agent zinc-glacial acetic acid is employed for the manufacture of keto alcohols.

12. Process as claimed in claim 10 wherein as reducing agent Raney nickel is employed for the manufacture of glycols.

13. 3-acetoxy-$\Delta_5$-androstenol-16-one-17.

14. 3 - acyloxy - $\Delta_5$ - androstenolone, the keto group being in one of the 16 and 17 positions and the hydroxy group being in the other of such positions.

15. 3 - acetoxy - $\Delta_5$ - androstenolone, the keto group being in one of the 16 and 17 positions and the hydroxy group being in the other of such positions.

16. Process for the manufacture of compounds of the androstane and oestrane series having an alcohol group in at least one of the 16 and 17 positions, comprising subjecting a 16,17-diketone of the androstane and oestrane series to the action of an agent capable of reducing a keto group to an alcohol group.

17. Process for the manufacture of $\alpha,\beta$-diketones of the androstane and oestrane series wherein the condensation products of the ketones of the said series with oxo-compounds are subjected to an oxidation process with an agent capable of splitting off the radical of the oxo-compound and replacing it with ketonic oxygen.

18. Process for the manufacture of glycols of the cyclo - pentano - polyhydro-phenanthrene series, comprising condensing a member of the group consisting of saturated and unsaturated ketones of the androstane and oestrane series with an oxo compound, in the presence of an agent capable of promoting condensation of a carbonyl group with a nuclear methylene group, subjecting the condensation product to an oxidation process to rupture the double bond produced by the condensation and form an $\alpha,\beta$-diketone, and thereafter reducing the diketone to the corresponding glycol.

19. Process according to claim 18, wherein the reduction is effected first by treatment with nascent hydrogen, and thereafter with catalytically activated hydrogen.

ADOLF BUTENANDT.
JOSEF SCHMIDT-THOMÉ.
ERWIN SCHWENK.